(12) United States Patent  (10) Patent No.: US 7,688,316 B2
Marcu  (45) Date of Patent: Mar. 30, 2010

(54) ADAPTIVE METHOD FOR ACQUIRING COLOR MEASUREMENTS

(75) Inventor: Gabriel Marcu, San Jose, CA (US)

(73) Assignee: Apple Inc., Cupertino, CA (US)

(*) Notice: Subject to any disclaimer, the term of this patent is extended or adjusted under 35 U.S.C. 154(b) by 1679 days.

(21) Appl. No.: 10/639,101

(22) Filed: Aug. 12, 2003

(65) Prior Publication Data
US 2005/0036053 A1 Feb. 17, 2005

(51) Int. Cl.
G06F 3/038 (2006.01)
G09G 5/00 (2006.01)
H04N 17/02 (2006.01)
G01R 31/00 (2006.01)

(52) U.S. Cl. ......................... 345/207; 348/184; 324/770

(58) Field of Classification Search ................. 345/207; 324/770; 348/180–194; 702/189–199
See application file for complete search history.

(56) References Cited

U.S. PATENT DOCUMENTS 5,874,988 A * 2/1999 Gu ............................... 348/97
6,340,976 B1 * 1/2002 Oguchi et al. ............... 345/690

* cited by examiner

*Primary Examiner*—Bipin Shalwala
*Assistant Examiner*—Steven E Holton
(74) *Attorney, Agent, or Firm*—Buchanan Ingersoll & Rooney PC

(57) ABSTRACT

A system and method for measuring a color parameter values of a display for calibration purposes. An initial measurement of the color parameter value from the display is performed. Next, a number of additional measurements is determined in response to the value of the initial color parameter value. The color parameter value of the display is measured by the number of additional measurements in order to determine an average color parameter value of the display which will be used for calibration purposes.

25 Claims, 5 Drawing Sheets

ADAPTIVE METHOD FOR ACQUIRING COLOR MEASUREMENTS

FIELD OF THE INVENTION

The present invention relates generally to the measurement of color signals produced by a monitor screen, and more particularly to a method and system that determines the number of measurements to perform.

BACKGROUND OF THE INVENTION

Computer monitors can have cathode ray tubes (CRT), liquid crystal displays (LCD) plasma screens, projections screens or flat panels as the screen that emits light according to electrical signals from a computer. The computer generates a standard set of instructions that produces electrical signals that the monitor uses to produce images on the screen.

However, monitors from different manufacturers produce different intensity levels of color on the screen for the same set of signals. In this respect, the same image viewed on monitors from different manufacturers or using different manufacturing technologies may appear different to a user because of different display characteristics such as primaries, optical transfer function, and white point. In order to overcome these differences, the monitors may be calibrated so that the color differences between monitors may be reduced.

This need for calibration is especially important for LCD screens. Often times LCD screens from different manufacturers or employing different display technologies will be used in the same product line. To ensure that the images are viewed consistently among monitors of the same product line, each LCD screen is calibrated.

Measurement tests are performed on the screen of the monitor to determine calibration settings. When each monitor is manufactured, the calibration settings are used to adjust how the monitor produces colors in order to generate consistent images. The calibration settings can also be applied in the computer system to the electrical signals that are sent to the monitor when the monitor is in use.

The calibration settings are found using a calibration system having a light sensor and a method to generate the calibration parameters from the values recorded by the sensor. A computer generates color test images on the monitor that are measured by the light sensor facing the screen. The light sensor measures the color parameters of the test images. The measurements are communicated back to the computer which generates the calibration settings therefrom.

The measurements can be a color parameter such as either tristimulus values in the form of (X, Y and Z), chromaticity (x,y) and luminance $(Y(Cd/m^2))$, or CIELAB values $(L^*a^*b^*)$. By measuring the color parameter for a number of colors, it is possible to determine calibration settings that are used to calibrate the monitor to accurately and consistently reproduce colors according to a reference calibration, which is usually referred to as target calibration.

In prior art methods, the number of multiple light measurements is fixed and set by the operator prior to performing the measurement. Thus, the computer takes multiple measurements for all the colors irrespective of whether the color is lighter or darker. In other words, multiple measurements are taken for the light colors even though they are not needed. By performing multiple measurements on each of the colors, the time to measure the color parameter is longer than what is really needed.

The present invention addresses the above-mentioned inefficiencies in measuring color parameter values by providing a system and method that determines the number of measurements to be performed. The system of the present invention only performs extra color measurements when they are needed, thereby avoiding extra measurements and thereby greatly increasing measurement speed.

SUMMARY OF THE INVENTION

There is provided a method for measuring color parameters of a monitor screen (i.e., display) for calibration purposes. An initial measurement of the color parameter is performed and the number of additional measurements is determined in response to the value of the initial measurement. The measurement of the color parameter of the monitor screen is repeated a number of times as a function of an initial color parameter value in order to determine an average color parameter value of the monitor screen that is used for calibration purposes.

For improved accuracy, multiple measurements are often required especially in the case of measuring low intensity light levels. Those levels correspond to dark colors shown on the screen. More measurements are taken by the light sensor for darker colors than for lighter colors in order to accurately determine the color parameters because the sensitivity of the light sensor to low intensities is usually lower than the sensitivity to the strong intensities.

The color parameter of the monitor screen may be the set of tristimulus values (X,Y,Z), chromaticity coordinates (x,y) and luminance $(Y(Cd/m^2))$, or CIELAB values $IL^*a^*b^*)$. The number of additional measurements is a function of the color parameter value of the initial measurement and the required accuracy from the measurement. When such accuracy cannot be achieved in a defined period of time, for practical reasons, the average value at the end of that period of time is the result of the measurement. The monitor screen can be either an LCD or CRT, or any other display technology.

It is also possible to dynamically measure the color parameter of the color on the monitor screen in order to determine the number of measurements for a particular tolerance. For example, after the initial measurement, additional measurements are performed until the average of the measurements converges to within a prescribed amount. The number of measurements will vary depending on the color parameter value that is measured from the monitor screen.

A system for measuring a color parameter value of a monitor screen has a sensor for measuring the color parameter (i.e., tristimulus value) and a computer in communication with the sensor. The computer is configured to determine based on the initial measurement from the sensor whether additional measurements are needed. Alternatively, the computer can determine whether additional measurements are necessary by determining whether the average of the measurements converges to a prescribed tolerance.

BRIEF DESCRIPTION OF THE DRAWING FIGURES

These, as well as other features of the present invention, will become more apparent upon reference to the drawings wherein.

DETAILED DESCRIPTION OF THE INVENTION

Figure 1:
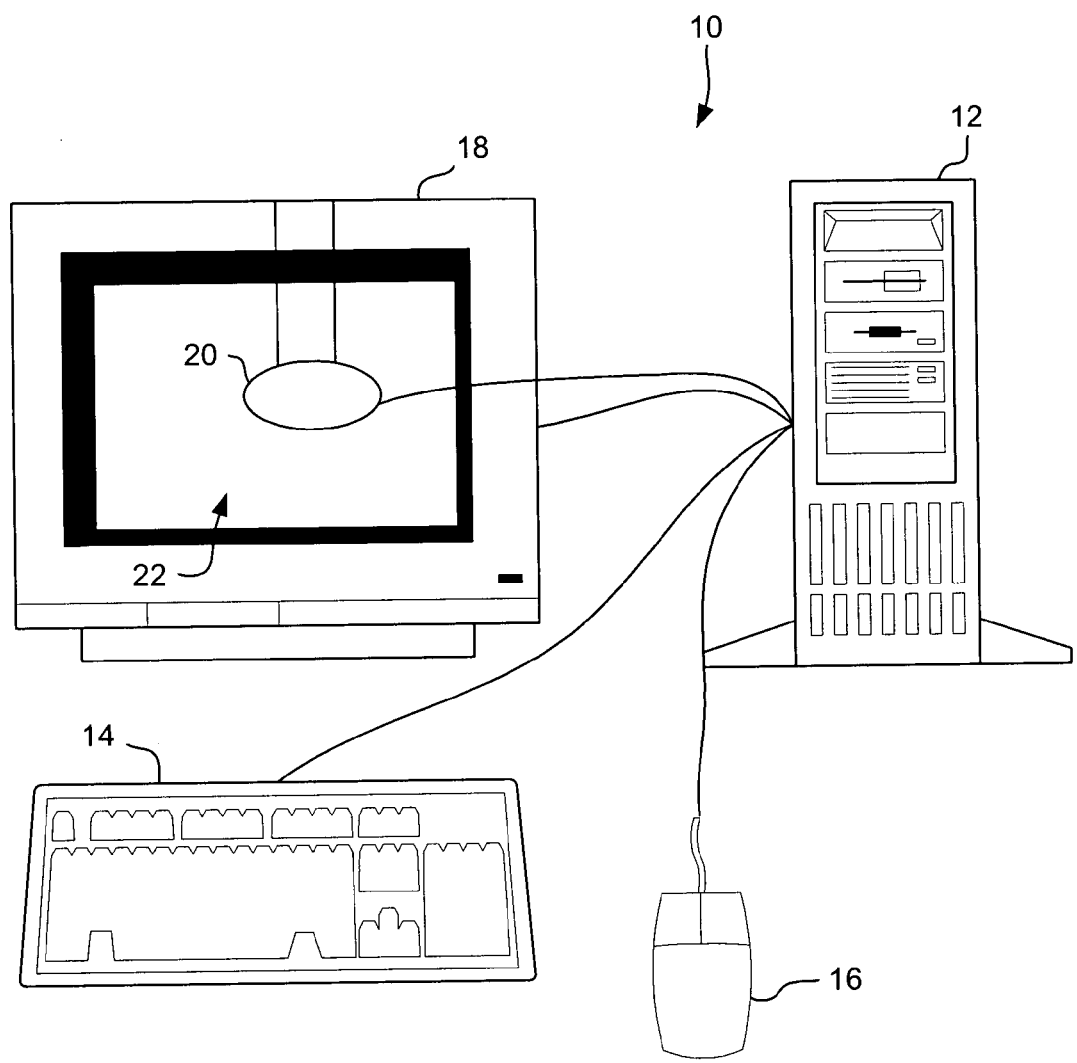
FIG. 1 illustrates a system for measuring a color parameter of a monitor.

Referring now to the drawings wherein the showings are for purposes of illustrating preferred embodiments of the present invention only, and not for purposes of limiting the same, FIG. 1 shows a calibration system 10 for generating calibration settings. The system 10 has a computer 12, a monitor 18, light sensor 20 and I/O devices (i.e., keyboard 14 and mouse 16). The monitor 18 has a screen 22 that is a CRT, LCD or any other display technology such as television, plasma or projection screen, etc. . . . The screen 22 generates reference images from signals of the computer 12. In order to generate the calibration settings, the computer 12 generates a series of colors on the screen 22. The light sensor 20 detects the color generated by the monitor screen 22 and reports color parameter data back to the computer 12. In an exemplary embodiment of the invention, the color parameter data is in the form of tristimulus values. Of course, any other suitable color parameters for quantitatively representing the color of the reference images can be utilized such as chromaticity (x,y) and luminance ($Y(Cd/m^2)$) or CIELAB values ($L^*a^*b^*$). With the color parameter data, the computer 12 can generate the calibration settings for the monitor 18.

Figure 2:
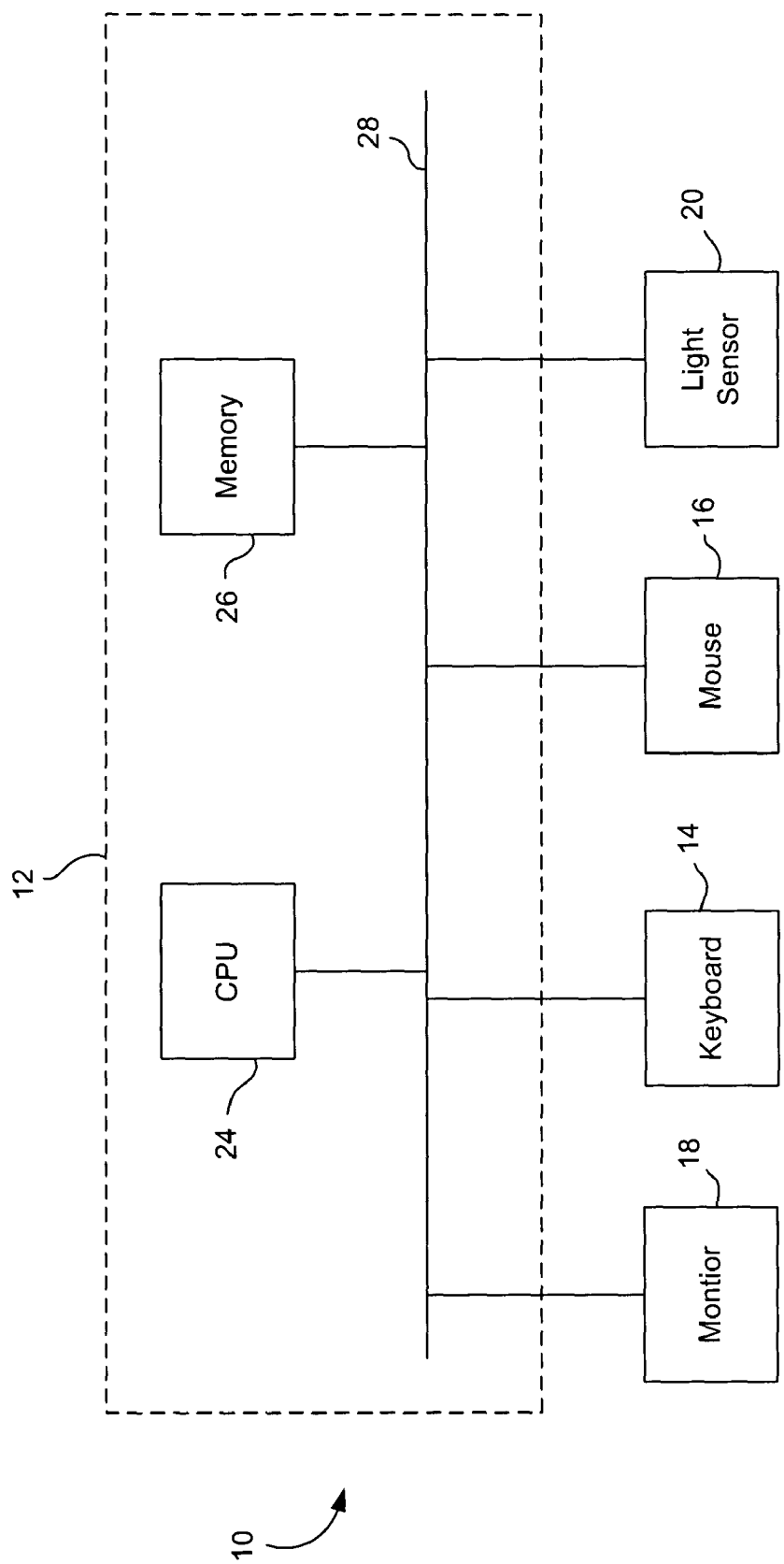
FIG. 2 is a block diagram of the system shown in FIG. 1.

FIG. 2 is a block diagram of the system 10 shown in FIG. 1. The computer 12 of the system 10 has a central processing unit (CPU) 24 and memory 26 (e.g., RAM, ROM, hard disk, etc. . . . ) in communication with the CPU 24 by system bus 28. The memory 26 contains program instructions that are executed by the CPU 24. The light sensor 20, as well as the keyboard 14 and mouse 16, interface with the system bus 28 in order to communicate with the CPU 24 and memory 26.

Figure 3:
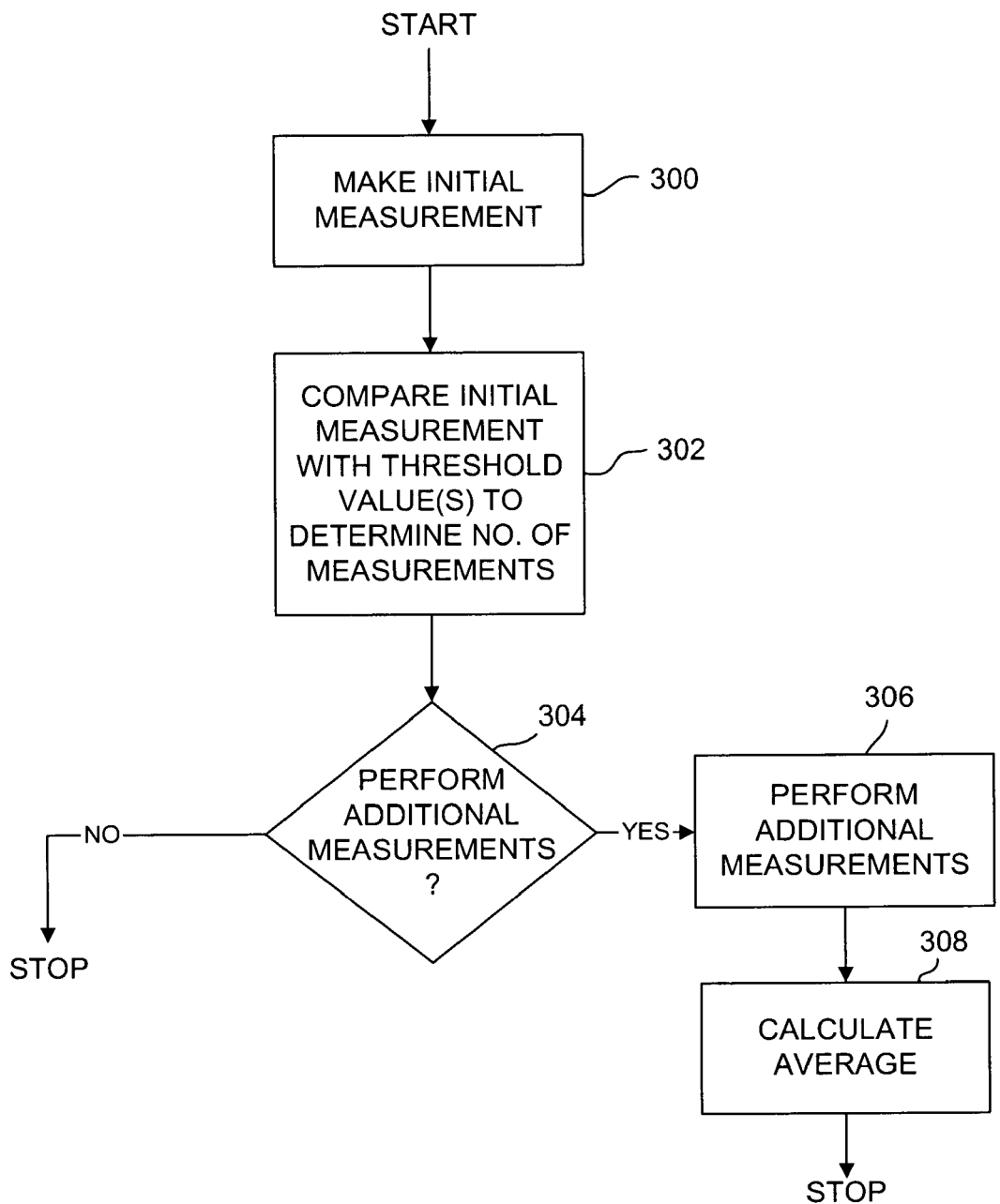
FIG. 3 is a flowchart showing how the number of measurements are optimized using the system of FIG. 1.

As previously mentioned, darker colors should preferably be measured multiple times in order to achieve an accurate color parameter measurement. The system 10 of the present invention adaptively varies the number of measurements to perform measurements within a particular tolerance. Referring to FIG. 3, a flowchart showing the operation of the computer 12 to adaptively vary the number of measurements is shown. The CPU 24 of the computer 12 executes the series of steps shown in FIG. 3 to adaptively measure the color parameters of the screen 22.

The process begins with the light sensor 20 making an initial color measurement of the monitor screen 22 in step 300. Specifically, the computer 12 generates a test image on the monitor screen 22 that the light sensor 20 detects. The light sensor 20 makes an initial measurement of the color of the test image and generates the corresponding color parameter value (i.e. tristimulus value).

Next, in step 302, the computer 12 will compare from the initial color parameter value how many measurements are needed for an accurate measurement. As mentioned above, darker images need more measurements in order to accurately determine the color parameter value (i.e. tristimulus value).

The function that determines the number of repeated measurements for a desired accuracy can be determined through experimental results. By measuring the colors on different monitors, it is possible to determine how many measurements are needed in order to determine the color parameter value at a desired level of accuracy.

Figure 4:
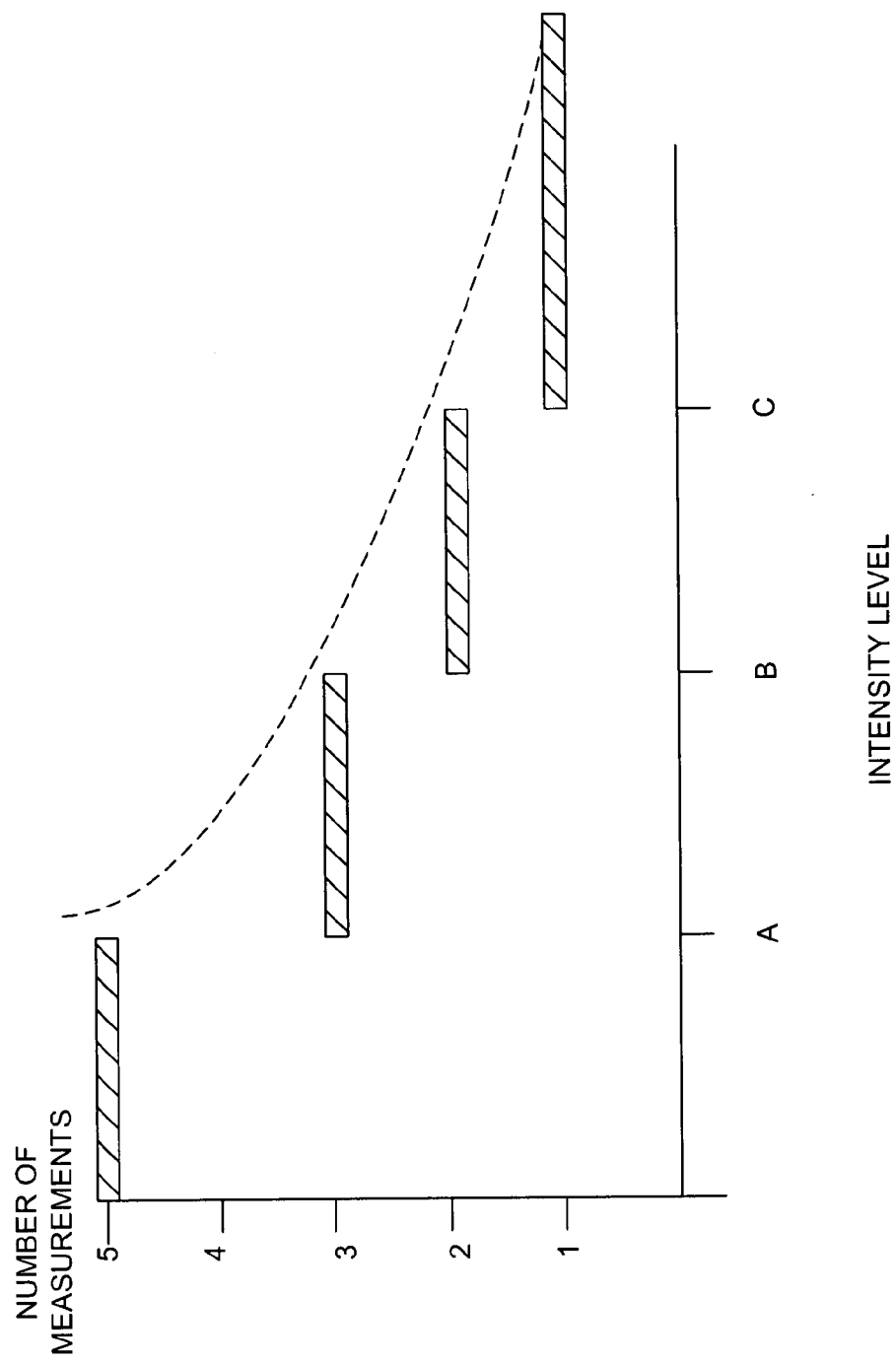
FIG. 4 is a graph showing how the number of measurements varies with color parameter values.

Once the number of measurements and corresponding color parameter values are determined, the function in a form of a table or graph can be created showing the relationship thereof. By way of example, FIG. 4 illustrates a theoretical relationship between the number of measurements and the luminance level, as one parameter value used for this exemplary implementation. As seen in FIG. 4, as the luminance level increases, the number of measurements needed decreases. The graph of FIG. 4 illustrates the situation where there are three threshold values "A", "B" and "C". When the initial luminance level measured by the light sensor 20 falls below point "A", then five measurements are used for an accurate measurement. If the luminance level is between points "A" and "B", then three measurements are used to determine the luminance level. Similarly, two measurements are used when the luminance level is between points "B" and "C", while for any luminance level above point "C", only one measurement is used to determine the luminance of the color to be measured.

Referring to step 302 of FIG. 2, the number of measurements by the light sensor 20 are determined by comparing the initial luminance level with the threshold value(s). Once the luminance level has been compared to the threshold value(s), then the number of measurements is determined by finding the number of measurements from the table or graph.

In step 304, if there are no more measurements to be performed (i.e., the initial value is above a predetermined threshold), then the process stops and the initial value is used as the measurement. However, if more measurements are to be performed, then the process proceeds to step 306 where further measurements are performed by the computer 12 with the sensor 20. Specifically, in step 306, the computer will perform M number of measurements where M is the total number of measurements to be made (including the initial measurement) as determined in step 302.

Once all the M number of measurements have all been performed, the process proceeds to step 308 where the average of the measurements is calculated. The computer 12 will calculate the average of the M measurements in order to determine the accurate luminance value. By averaging the measurements, a more accurate luminance level is found rather than using just the initial measurement. The process stops once the average luminance level is found with the desired accuracy. The metric for the desired accuracy may be, but is not limited to, the standard deviation of the luminance value. The average luminance level is used to determine the calibration settings for the monitor 18.

The process of FIG. 3 can be used for each of the colors to be generated on the monitor 18. Typically, the computer 12 will generate a series of color images on the monitor screen 22. Each image will be a different color and have a different color parameter value. The process shown in FIG. 3 will be performed on each image in order to determine the most accurate color parameter values. As will be recognized, by adaptively varying the number of measurements, fewer number of measurements may be performed. As such, extraneous measurements are avoided, thereby saving time in determining the calibration settings for the monitor 18.

Figure 5:
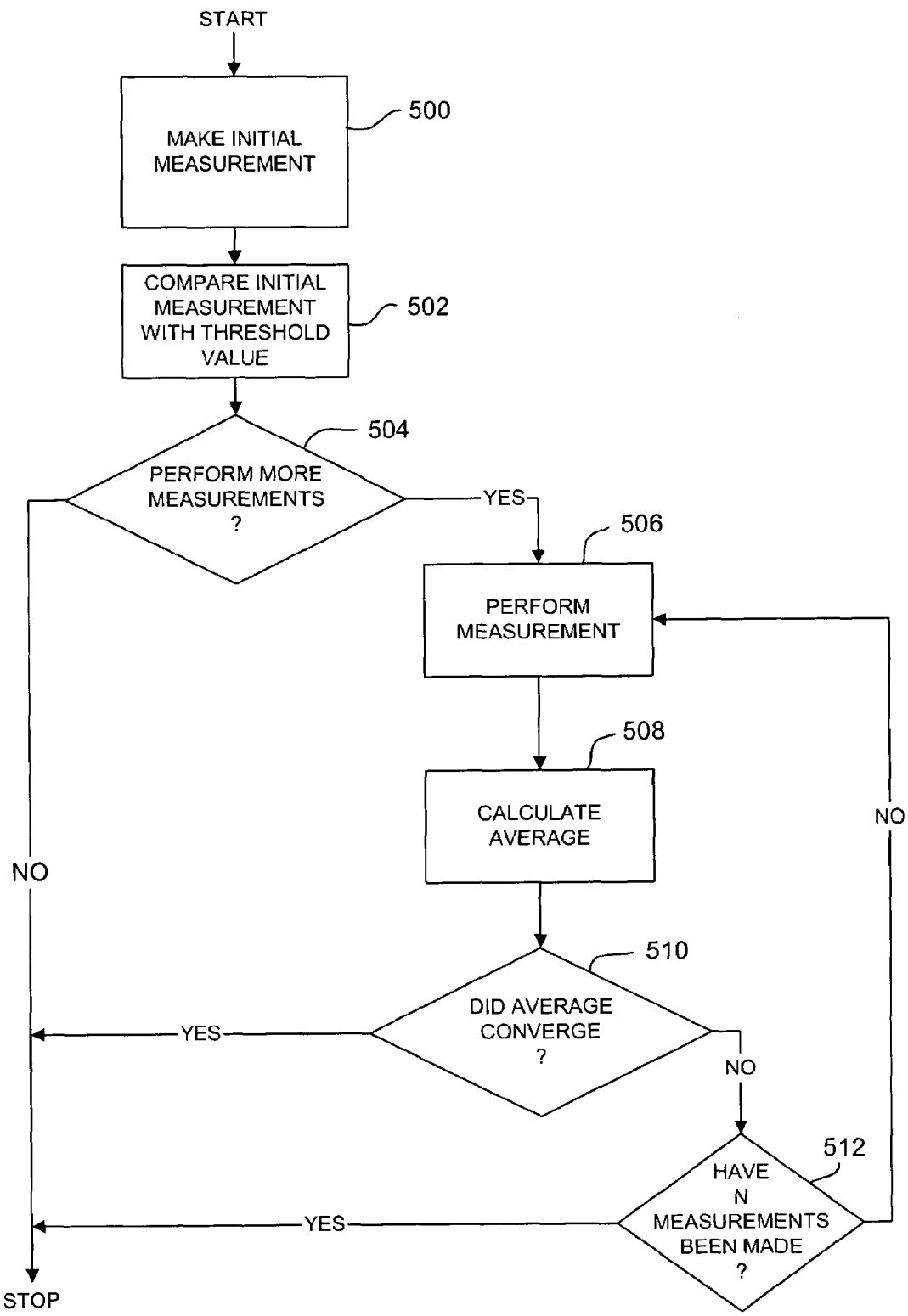
FIG. 5 is a flowchart showing how the number of measurements may be dynamically optimized using the system of FIG. 1.

In addition to the foregoing, it is also possible to dynamically vary the number of measurement steps based upon an average value of the color parameter level. Referring to FIG. 5, a process for dynamically varying the number of measurement steps is shown. The process begins in step 500 whereby an initial measurement is taken with the light sensor 20. Next, the initial measurement is compared to a threshold value in step 502. The threshold value is the minimum color parameter level at which only one measurement with the light sensor 20 is needed. If the value of the initial measurement is above the threshold value, then there is no need to perform additional measurements. However, if the value of the initial measurement is below the threshold value, then more measurements are needed to get an accurate reading.

The process proceeds to step 504 where it is determined whether more measurements are needed. If the initial measurement is above the threshold color parameter value as determined in step 502, the process will stop. However, if the initial measurement is below the threshold level as determined in step 502, the process proceeds to step 506.

In step 506, the light sensor 20 will again measure the color parameter of the color shown on the screen 22. Once the measurement has been performed, then the process proceeds to step 508 where the average of the measurements is calculated. In step 508, all of the measurements taken so far are averaged together in order to determine a color parameter value that is an average value. Next, in step 510, the computer 12 determines whether the average has converged to within a prescribed tolerance. The newly computed average is compared with a previous average value to determine whether more measurements are needed. If the average does not vary by a prescribed amount from the previous average (i.e., by the prescribed tolerance), then the average has converged and more measurements are unnecessary because the desired level of accuracy has been reached. In this case, the process will stop. However, if the average does not converge, then the process continues to step 512. Alternatively, a standard deviation of the measurements could be used instead of the average to determine whether more measurements are necessary. In this instance, if the standard deviation is equal to or less than a prescribed value, then the process will stop.

In addition to the foregoing, it is also possible to determine whether the process should terminate from only two measurements. For example, after two measurements have been made, the difference between the measurement values is determined. If this value is equal to or less than a prescribed value then the process stops because the two measurements are within a prescribed tolerance of each other. Otherwise, the process continues until the average converges to the prescribed tolerance.

It is possible that in step 510, the average will never converge to the prescribed tolerance. In that instance, the computer 12 will stop the process once a prescribed number of measurements (N) is reached. In step 512, once N number of measurements has been reached, the process stops. This prevents the computer 12 from performing measurements if the average value is not converging. The number of N measurements can be set high enough to obtain a desired accuracy, yet low enough to prevent the computer 12 from performing meaningless measurements. If the number of measurements has not yet reached the prescribed value N, then the computer 12 will proceed to step 506, whereby the process of performing more measurements continues until the average converges.

As seen with the flowchart of FIG. 5, the computer 12 will reach the number of measurements by determining whether the average of the measurements is converging to a prescribed tolerance. This is a more flexible approach than determining a fixed number of measurements based on a threshold intensity level because the number of measurements is determined based on a desired level of accuracy.

It will be recognized by those of ordinary skill in the art that the measurement processes described for FIGS. 3 and 5 provide a method that optimizes the time needed for measuring. For example, in a given period of time, the images that need more measurements due to low color levels will have more measurements performed in a given time period.

Additional modifications and improvements of the present invention may also be apparent to those of ordinary skill in the art. Thus, the particular form of the invention described and illustrated herein is intended to represent only certain embodiments of the present invention, and is not intended to serve as limitations of alternative forms within the spirit and scope of the invention.

What is claimed is:

1. A method of measuring a color parameter value of a display device, the method comprising the following steps:
    measuring an initial color parameter value of the display device;
    comparing the initial color parameter value to a threshold value;
    determining whether additional measurements are needed in response to the comparison of the initial color parameter value to the threshold value;
    continuing to measure the color parameter value of the display device until an average of the measured color parameter values converges to a prescribed tolerance; and
    providing a determined color parameter value based on the averaged measured color parameter values.

2. The method of claim 1 wherein the color parameter value is represented as a tristimulus value from the display device.

3. The method of claim 1 wherein the color parameter value is chromaticity and luminance information for the display device.

4. The method of claim 1 wherein the display device is selected from the group consisting of:
    a cathode ray tube;
    a liquid crystal display;
    a television screen;
    a plasma screen; and
    a projection screen.

5. The method of claim 1 wherein the number of additional measurements is zero if the initial color parameter value exceeds the threshold value.

6. The method of claim 1, further comprising the step of:
    calibrating the display device in accordance with the determined color parameter value.

7. A system for measuring a color parameter value of a display device, the system comprising:
    a computer system configured to:
    receive an initial color parameter value of the image on the display device measured by a sensor,
    compare the initial color parameter value with a threshold value,
    determine whether additional measurements of the same image are necessary in response to comparing the initial color parameter value with the threshold value,
    initiate at least one additional measurement of the image if a determination is made that additional measurements are necessary, and
    provide a determined color parameter value for the display device based on an average of the measured color parameter values.

8. The system of claim 7 wherein the color parameter value is represented as a tristimulus value.

9. The system of claim 7 wherein the color parameter value is chromaticity and luminance information for the image.

10. The system of claim 7 wherein the number of additional measurements are determined from a function in response to the initial color parameter value.

11. The system of claim 7 wherein the number of additional measurements is zero if the initial color parameter value exceeds the threshold value.

12. A system for measuring a color parameter value of a display device, the system comprising:
a computer system configured to:
receive an initial color parameter value of the display device measured by a sensor,
compare the initial color parameter value with a threshold value,
determine whether additional measurements are necessary in response to comparing the initial color parameter value with the threshold value,
if a determination is made that additional measurements are necessary, cause the sensor to continue to measure the color parameter value of the display device until an average of the measured color parameter values converges to a prescribed tolerance; and
provide a determined color parameter value for the display device based on an average of the measured color parameter values.

13. A system for measuring a color parameter value of a display device, the system comprising:
means for receiving an initial color parameter value measurement of an image displayed on the display device; and
computing means for determining whether additional measurements of the same image by the detecting means are required by comparing the initial color parameter value measurement to a threshold value,
wherein if a determination is made that additional measurements are necessary, the computing means causes at least one additional measurement of the image to be performed and the computing means averages the measured values to obtain a determined color parameter value for the display device.

14. The system of claim 13 wherein the computing means determines the number of additional measurements in accordance with a pre-defined function.

15. The system of claim 13 wherein the color parameter value is represented as a tristimulus value.

16. The system of claim 13 wherein the color parameter value is chromaticity and luminance information.

17. The system of claim 13 further including a light sensor for obtaining said measurements.

18. A system for measuring a color parameter value of a display device, the system comprising:
means for receiving an initial a color parameter value measurement of the display device; and
computing means for determining whether additional measurements are required by comparing the initial color parameter value measurement to a threshold value,
wherein if a determination is made that additional measurements are necessary, the computing means causes at least one additional measurement to be performed and the computing means averages the measured values to obtain a determined color parameter value for the display device, and upon the computing means determining that an average value of the measurements has not converged to a prescribed tolerance, the causes at least one further measurement to be performed.

19. A method of measuring a color parameter value of a display device, the method comprising the following steps:
measuring a first color parameter value of the display device;
measuring a second color parameter value of the display device;
determining a difference between the first and second color parameter values;
continuing to measure the color parameter value of the display device if the difference between the first and second color parameter values is greater than a prescribed tolerance and until an average of the color parameter values converges to the prescribed tolerance; and
providing a determined color parameter value based on the averaged color parameter values.

20. The method of claim 19 wherein the color parameter value is represented as a tristimulus value for the display device.

21. The method of claim 19 wherein the color parameter value is chromaticity and luminance information about the display device.

22. The method of claim 19 wherein the display device is selected from the group consisting of:
a cathode ray tube;
a liquid crystal display;
a television screen;
a plasma screen; and
a projection screen.

23. The method of claim 19, further comprising the step of:
calibrating the display device in accordance with the determined color parameter value.

24. A method for measuring a color parameter value of a display, the method comprising the steps of:
performing an initial color parameter value measurement of an image on the display;
comparing the initial color parameter value measurement to a threshold value;
determining a number of additional measurements of the same image to be performed in response to the comparison between the initial color parameter value measurement and the threshold value;
measuring the color parameter value of the display the number of additional measurements; and
averaging the additional measurements in order to calculate the color parameter value of the display.

25. A system for measuring a color parameter value of a display, the system comprising:
a light sensor for detecting a color parameter value of the display;
a computer system in communication with the light sensor, the computer system having a computer-readable medium containing a program which executes the following procedure:
performing an initial color parameter value measurement of an image on the display;
comparing the initial color parameter value measurement to a threshold value;
determining a number of additional measurements of the same image to be performed in response to the comparison between the initial color parameter value measurement and the threshold value;
measuring the color parameter value of the display the number of additional measurements; and
averaging the additional measurements in order to calculate the color parameter value of the display.

* * * * *

UNITED STATES PATENT AND TRADEMARK OFFICE
CERTIFICATE OF CORRECTION

PATENT NO. : 7,688,316 B2  
APPLICATION NO. : 10/639101  
DATED : March 30, 2010  
INVENTOR(S) : Gabriel Marcu Page 1 of 1

It is certified that error appears in the above-identified patent and that said Letters Patent is hereby corrected as shown below:

In Sheet 2 of 5, Reference Numeral 18, in Figure 2, line 1, delete "montior" and insert -- monitor --, therefor.

Signed and Sealed this
Fifteenth Day of November, 2011

David J. Kappos
*Director of the United States Patent and Trademark Office*